No. 748,120. PATENTED DEC. 29, 1903.
M. P. & D. TODD.
KINDERGARTEN LOOM.
APPLICATION FILED MAY 2, 1903.
NO MODEL.
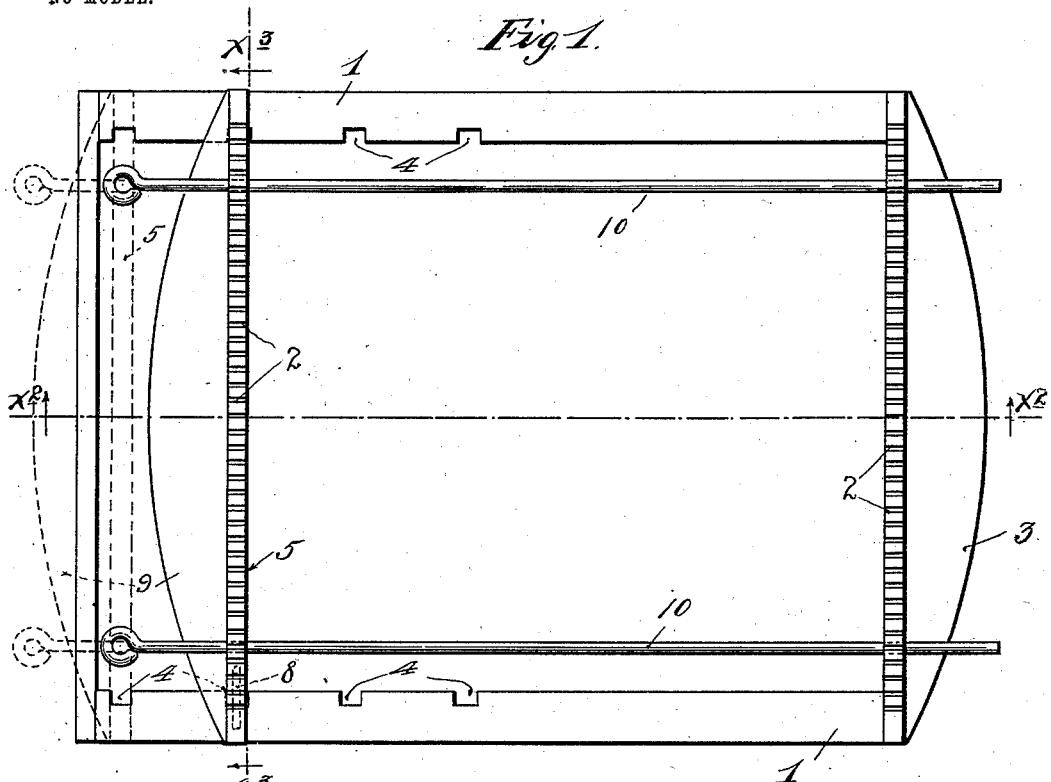
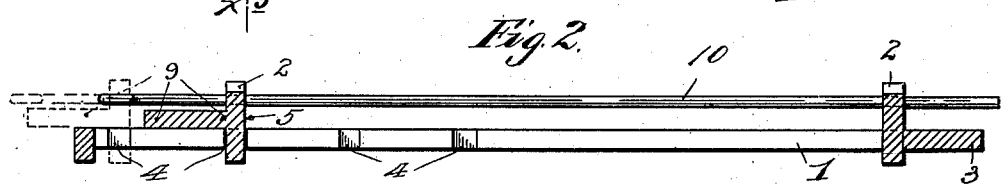
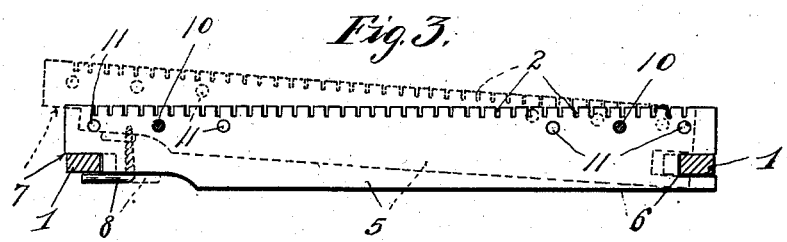
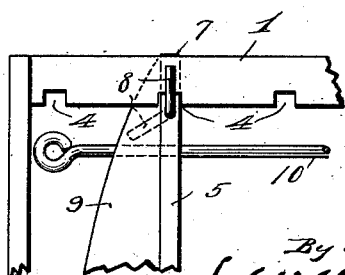
Witnesses.
H. D. Kilgore
A. H. Opsahl.
Inventors.
Martha P. Todd.
Dana Todd.
By their Attorneys.
Williamson & Merchant No. 748,120. Patented December 29, 1903.

UNITED STATES PATENT OFFICE.

MARTHA P. TODD AND DANA TODD, OF MINNEAPOLIS, MINNESOTA.

KINDERGARTEN-LOOM.

SPECIFICATION forming part of Letters Patent No. 748,120, dated December 29, 1903.

Application filed May 2, 1903. Serial No. 155,260. (No model.)

*To all whom it may concern:*

Be it known that we, MARTHA P. TODD and DANA TODD, citizens of the United States, residing at Minneapolis, in the county of Hennepin and State of Minnesota, have invented certain new and useful Improvements in Kindergarten-Looms; and we do hereby declare the following to be a full, clear, and exact description of the invention, such as will enable others skilled in the art to which it appertains to make and use the same.

Our present invention relates to hand-looms of the general character set forth and claimed in our prior patent, No. 679,132, of date July 23, 1901, and has for its object to improve the same in the several particulars hereinafter noted.

To the above ends the invention consists of the novel devices and combinations of devices hereinafter described, and defined in the claims.

The invention is illustrated in the accompanying drawings, wherein like characters indicate like parts throughout the several views.

Figure 1 is a plan view of the complete loom. Fig. 2 is a section on the line $x^2$ $x^2$ of Fig. 1. Fig. 3 is a transverse section on the line $x^3$ $x^3$ of Fig. 1, and Fig. 4 is a bottom plan view of a portion of the loom.

The body of the loom is in the form of a rectangular frame 1. One of the transverse end bars of the frame 1 is notched, as shown at 2, to afford a series of projections over which the warp may be turned and by which the warp may be secured and properly spaced. To this notched end bar is rigidly secured an outwardly-extending convex flange 3, the purpose of which will presently appear. The inner edges of the sides of the loom-frame are formed with notches 4, arranged in oppositely-alined pairs and adapted to receive the ends of an adjustable notch-bar 5, the notches of which coöperate with the notches on the opposite ends of the frame to hold the warp. It will thus be seen that the transverse bars 2 and 5 are, in effect, provided with a plurality of projections for holding the warp-threads spaced apart. In this preferred arrangement one end of the bar 5 is notched at 6, so that it will straddle or embrace the engaged side of the loom. The other end of the bar 5 is simply cut out or rabbeted at 7, so that it rests upon the opposite side of the frame 1, with its abutting lower edges approximately flush with the under surface of the said side. To lock the loose end of the bar to the adjacent side of the loom-frame, it is provided with a pivoted detent or lock-finger 8, which when turned as shown by full lines in Figs. 3 and 4 securely locks the bar to the loom-frame.

Rigidly secured to the adjustable bar 5 is a convex rib 9, which bows reversely from the flange 3 and is adapted for use in conjunction therewith in making miniature hammocks or other work requiring the work to be gathered or shortened at its sides. This flange 9 is of course adjustable with the bar 5 and is adapted to be projected over and beyond the upper end of the loom, as shown by dotted lines in Figs. 1 and 3.

Rods 10, which serve to keep the edges of the fabric straight, are passed through any of the several pairs of alined perforations 11, formed in the adjustable bar 5 and in the notched foot or lower end bar of the frame 1. It will thus be seen that the loom is made adjustable in one direction by the adjustment of the bar 5 and in the other direction by the lateral adjustment of the rods 10. This adapts the loom for making fabrics varying greatly in dimensions and proportions.

To adjust the bar 5, the lock-finger 8 is first turned, substantially as indicated by dotted lines in Fig. 4, so that one end of the bar may be raised, as indicated by dotted lines in Fig. 3. This being done, the bar is moved slightly endwise, so as to disengage the opposite end of the bar from the notch in the side of the frame 1, and the bar may then of course be moved into engagement with any other of the pair of notches 4 and again locked to the frame in a manner already described. This may be done even with the rods 10 left in working position; but, if desired, the rods may of course be first removed. In fact, when this adjustment takes place the rods would usually be removed from the frame.

The above construction provides an extremely simple, cheap, and efficient loom which is easily adjusted for any piece of work and which is not liable to get out of order.

All parts of the loom, except the rods 10 and lock-finger 8, are preferably made of wood.

The device described is capable of considerable modification within the scope of our invention, as herein set forth and claimed.

The invention is, as is evident, capable of modification within the scope of our invention, as herein set forth and claimed.

What we claim as new, and desire to secure by Letters Patent of the United States, is as follows:

1. The combination with a loom-frame having notches on the inner edges of its side bars, and having, at one end, a warp-supporting bar, of a coöperating adjustable warp-supporting bar engageable at its ends with the notches in the sides of said frame, substantially as described.

2. The combination with a loom-frame, of an adjustable warp-supporting bar having at one end a movable detent for locking the same to one side of the said frame, and means for securing the other end of the said adjustable bar to the opposite side of the loom-frame, substantially as described.

3. The combination with the loom-frame 1, having at one end, the notched bar 2 and having in its sides notches 4, of the adjustable bar 5 formed at one end with the notch 6 and provided at its other end with the rabbet 7 and coöperating pivoted lock-finger 8, the ends of which bar 5 engage said notches 4 and are adapted to be locked to said frame by said finger 8, substantially as described.

4. The combination with the loom-frame having at one end the warp-supporting bar 2 and rigidly-secured convex flange 3, of the adjustable warp-supporting bar 5 provided with the rigidly-secured convex flange 9, which parts 5 and 9 are adjustable together, substantially as described.

In testimony whereof we affix our signatures in presence of two witnesses.

MARTHA P. TODD.
DANA TODD.

Witnesses:
ELIZABETH H. KELIHER,
FRANK D. MERCHANT.